(12) United States Patent
Cohen et al.

(10) Patent No.: US 8,743,698 B2
(45) Date of Patent: *Jun. 3, 2014

(54) SENSOR EMULATION USING MOTE NETWORKS

(75) Inventors: Alexander J. Cohen, Mill Valley, CA (US); Edward K.Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 537 days.

This patent is subject to a terminal disclaimer.

(21) Appl. No.: 12/927,286

(22) Filed: Nov. 9, 2010

(65) Prior Publication Data

US 2011/0205082 A1 Aug. 25, 2011

Related U.S. Application Data

(63) Continuation of application No. 11/203,571, filed on Aug. 12, 2005, now Pat. No. 7,830,805.

(51) Int. Cl.
*G06F 11/00* (2006.01)

(52) U.S. Cl.
USPC .................................................. 370/241

(58) Field of Classification Search
USPC .......... 340/500, 531, 539.1, 539.22; 370/241, 370/242, 245, 252, 310, 328, 351, 389, 370/395.1, 395.5, 395.53; 455/403, 404.1, 455/404.2, 422.1, 456.1
See application file for complete search history.

(56) References Cited

U.S. PATENT DOCUMENTS

| | | | |
|---|---|---|---|
| 4,274,381 A | 6/1981 | Abo | |
| 5,153,835 A | 10/1992 | Hashimoto et al. | |
| 5,627,751 A | 5/1997 | Davis et al. | |
| 6,006,604 A * | 12/1999 | Rabelo et al. | 73/290 R |
| 6,804,600 B1 * | 10/2004 | Uluyol et al. | 701/100 |
| 2004/0128097 A1* | 7/2004 | LaMarca et al. | 702/104 |
| 2004/0173006 A1* | 9/2004 | McCoy et al. | 73/40.7 |

OTHER PUBLICATIONS

K. Mechitov, W. Kim, G. Agha & T. Nagayama, High-Frequency Distributed Sensing for Structure Monitoring, Department of Computer Science, University of Illinois at Urbana-Champaign, Urbana, IL, USA.

* cited by examiner

*Primary Examiner* — Obaidul Huq

(57) ABSTRACT

A method may include and/or involve collecting readings from a number of mote sensors of a mote network, the mote sensors at a number of mote sensor locations, and emulating, as a source or sources of the readings, a number of sensors at a number of sensor locations.

30 Claims, 3 Drawing Sheets

SENSOR EMULATION USING MOTE NETWORKS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation of U.S. patent application Ser. No. 11/203,571, entitled SENSOR EMULATION USING MOTE NETWORKS naming Alexander J. Cohen, John D. Rinaldo, Jr., Robert W. Lord, Mark A. Malamud, Royce A. Levien, and Edward K. Y. Jung as inventors, filed Aug. 12, 2005, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant may be designating the present application as a continuation of its parent application(s) as set forth above, but expressly points out that such designations are not to be construed in any way as any type of commentary and/or admission as to whether or not the present application contains any new matter in addition to the matter of its parent application(s).

TECHNICAL FIELD

The present disclosure relates to mote networks, and more particularly to emulation of non-mote sensors using mote networks.

BACKGROUND

Mote sensors may be distributed throughout an area and/or volume of interest. The mote sensors may interact to form a mote network. Mote networks may be advantageously employed in environments and/or applications involving non-mote sensors.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve collecting one or more readings from a number of mote sensors of a mote network, the number of mote sensors at a number of mote sensor locations, and emulating, as a source or sources of the one or more readings, a number of sensors at a number of sensor locations. Emulating, as a source or sources of the one or more readings, a number of sensors at a number of sensor locations may include and/or involve emulating, as a source or sources of the readings, a number of sensors at a number of sensor locations different than the number of mote sensors, and/or collecting the one or more readings from a number of mote sensors less than the number of the one or more sensors, and/or collecting the one or more readings from at least one mote sensor location different than any of the number of sensor locations, and/or emulating one sensor, and/or improving upon an accuracy of the one or more readings over an accuracy of one or more readings from the number of sensors, and/or collecting the one or more readings from a number of mote sensors greater than the number of sensors. In addition to the foregoing, other method aspects are described in the claims, drawings and text forming a part of the present application.

The method may include and/or involve adapting one or more of the number of mote sensors, the number of mote sensor locations, or the one or more mote sensor locations to account for one or more failed mote sensors and/or involve adapting one or more of the number of mote sensors, the number of mote sensor locations, or the one or more mote sensor locations to account for one or more failed mote sensors may include and/or involve the mote network adapting one or more of the number of mote sensors, the number of mote sensor locations, or the mote sensor locations to account for one or more failed mote sensors. In addition to the foregoing, other method aspects are described in the claims, drawings and text forming a part of the present application.

The method may include and/or involve changing at least one of the mote sensor locations to improve the accuracy of the emulating of the number of sensors. Changing at least one of the mote sensor locations to improve the accuracy of the emulating of the number of the sensors may include and/or involve the mote network selecting at least one of the mote sensor locations to improve the accuracy of the emulating of the number of the sensors. In addition to the foregoing, other method aspects are described in the claims, drawings and text forming a part of the present application.

The method may include and/or involve adapting the emulating to account for one or more changes to one or more of the mote sensor locations, accuracy of the emulating of the number of sensors, performance of the emulating of the number of sensors, or to one or more changes in the environment of the mote network. In addition to the foregoing, other method aspects are described in the claims, drawings and text forming a part of the present application.

The method may include and/or involve observing at least one of a behavior or a characteristic of the number of sensors, and refining a selection of at least one of the mote sensors, the number of mote sensors, the mote sensor locations, or the number of mote sensor locations in order to improve emulation of at least one of the behavior or the characteristic of the number of sensors. Observing at least one of a behavior or a characteristic of the number of sensors and refining a selection of at least one of the mote sensors, the number of mote sensors, the mote sensor locations, or the number of mote sensor locations in order to improve emulation of at least one of the behavior or the characteristic of the number of sensors may include and/or involve the mote network observing at least one of a behavior or a characteristic of the number of sensors and refining a selection of at least one of the mote sensors, the number of mote sensors, the one or more mote sensor locations, or the number of mote sensor locations in order to improve emulation of at least one of the behavior or the characteristic of the number of sensors. In addition to the foregoing, other method aspects are described in the claims, drawings and text forming a part of the present application-.rtert a part of the present application.

The method may include and/or involve selecting one or more replacement mote sensors to replace one or more failed mote sensors as a source of the one or more collected readings. Selecting one or more replacement mote sensors to replace one or more failed mote sensors as a source of the one or more collected readings may include and/or involve the mote network selecting one or more replacement mote sensors to replace one or more failed mote sensors as a source of the one or more collected readings. In addition to the foregoing, other method aspects are described in the claims, drawings and text forming a part of the present application.

The method may include and/or involve the mote network selecting at least one of the mote sensor locations to improve an accuracy of the one or more derived readings. In addition to the foregoing, other method aspects are described in the claims, drawings and text forming a part of the present application.

The method may include and/or involve adapting the emulating to account for one or more changes to the one or more mote sensor locations. In addition to the foregoing, other method aspects are described in the claims, drawings and text forming a part of the present application.rwerwer the present application.

An apparatus may include and/or involve logic to receive one or more readings from two or more mote sensors, logic to convert the one or more readings into at least one non-mote sensor reading, and logic to communicate the at least one non-mote sensor reading via a non-mote sensor interface. The logic to communicate the at least one non-mote sensor reading via a non-mote sensor interface may include and/or involve logic to emulate a manner of communication of the at least one non-mote sensor. In addition to the foregoing, other apparatus aspects are described in the claims, drawings and text forming a part of the present application.

The apparatus may include and/or involve logic to apply location information for the two or more mote sensors to derive at least one emulated non-mote sensor location. In addition to the foregoing, other apparatus aspects are described in the claims, drawings and text forming a part of the present application.

The apparatus may include and/or involve logic to select at least one mote sensor to provide the one or more readings. The logic to select at least one mote sensor to provide the one or more readings may include and/or involve logic to select one or more mote sensors to compensate for at least one failed mote sensor, and/or logic to select at least one mote sensor to increase an accuracy of emulation of the at least one non-mote sensor. In addition to the foregoing, other apparatus aspects are described in the claims, drawings and text forming a part of the present application.

The apparatus may include and/or involve logic to emulate at least one source of non-mote sensor readings. In addition to the foregoing, other apparatus aspects are described in the claims, drawings and text forming a part of the present application.

The apparatus may include and/or involve logic to cause a change in at least one location from which the one or more readings are provided. The logic to cause a change in at least one location from which the one or more readings are provided may include and/or involve logic to deselect at least one mote as a source of the one or more readings and to select at least one other mote as the source of the one or more readings, and/or logic to cause at least one mote that is a source of the one or more readings to change position. In addition to the foregoing, other apparatus aspects are described in the claims, drawings and text forming a part of the present application.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

System Providing Mote Network Emulation of One or More Legacy Sensor Devices

Figure 1:
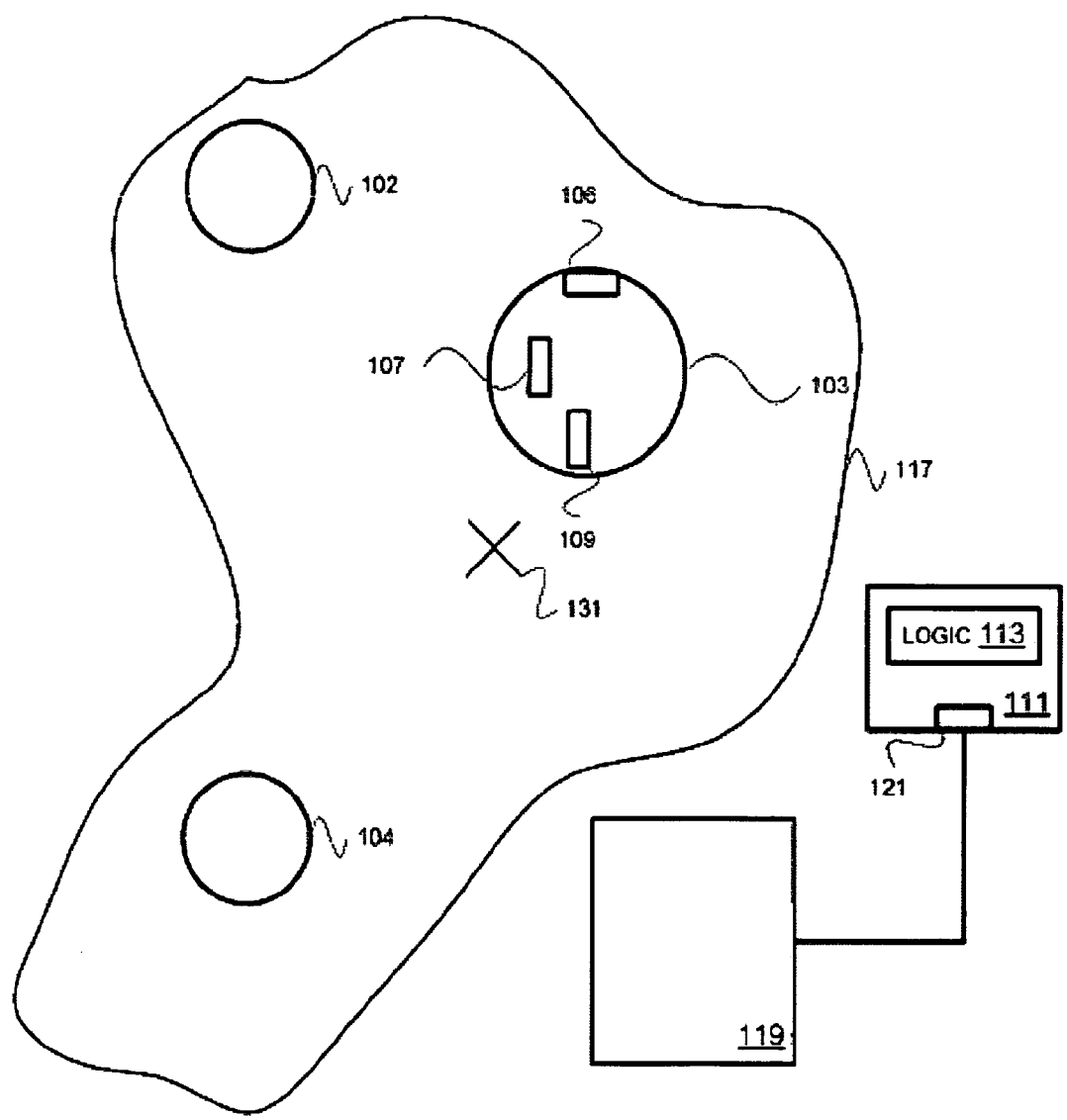
FIG. 1 is a block diagram of an embodiment of a system providing mote network emulation of one or more legacy sensor devices.

FIG. 1 is a block diagram of an embodiment of a system providing mote network emulation of one or more legacy sensor devices.

A mote network within a volume/area 117 includes multiple mote sensor/processors. For purposes of illustration, three motes 102, 103, and 104 are shown, although in practice the network could have more or fewer (typically more) motes. Mote 103 is shown in more detail, having a communication interface 106, an environmental sensor 107, and other logic 109 to carry out/participate in various acts as described herein.

The system further includes at least one external device 111 having its own logic 113 to carry out/participate in acts described herein, and at least one legacy device 119 adapted to interact with non-mote (a.k.a. legacy) sensors. The device 111 may include an interface 121 to interact with the device 119 by emulating one or more non-mote sensors.

Readings may be collected from a number of mote sensors (e.g., one, two, three, etc., mote sensors) of a mote network (henceforth, "data collection"), the mote sensors located at a number of mote sensor locations. A number of "legacy" (a.k.a. non-mote) sensors may be emulated as a source or sources of the readings (henceforth, "sensor emulation"). In systems where the location of the legacy sensors is a factor, legacy sensors may be emulated to be at particular locations.

Sensor emulation may include and/or involve emulating, as a source or sources of the readings, a number of sensors at a number of sensor locations different than the number of mote sensors. For example, a large room may be created by merging two rooms (e.g. removing a wall), each room having a thermocouple connecting to the heating system. The thermocouples may be removed as part of the renovation, with the wires to the thermocouples remaining. To replace the removed thermocouples, a large number of motes (say, 80 motes, including motes 102-104) having temperature sensors may be placed in locations throughout the room. The interface device 111 may be attached to the thermocouple wires to the heating system. Furthermore, sensor emulation may include emulation of another mote network; for example, a new mote sensor network might emulate an old (e.g., failing) one.

Emulation information may be provided to the device 111 in order to enable the device 111 to emulate the removed thermocouples using readings from one or more motes of the mote network. One or more of the motes may communicate temperature readings to the device 111, which may apply logic 113 to emulate the thermocouple readings using the mote readings. The device 111 may convert the mote readings to analog signals compatible with the legacy thermocouple wires and may communicate these signals using the wires to the heating system.

Thus, data collection may involve collecting readings from a number of mote sensors more or less than the number of sensors being emulated. There may be various manners of implementing data collection, including but not limited to collecting readings from at least one mote sensor at a location different than any of the sensor locations. A single sensor may be emulated, possibly at a single location such as location 131, or more than one sensor of the same or different types may be emulated. (See the previous example for a collection of a large number of motes that emulate in this case, two thermocouples).

Sensor emulation may involve improving upon an accuracy of readings that would be provided by the sensors. Greater accuracy may be accomplished by collecting readings from a number of mote sensors greater than the number of sensors. Thus, in the previous example, emulation of two thermocouples by a large number of mote sensors may, in some situations, increase the accuracy of the temperature readings, through statistical averaging and other techniques, by an order of magnitude or more over what the sensors themselves could provide.

As a second manner of accomplishing greater accuracy, the mote sensors may use a different physical technique to obtain their readings than that of the emulated sensors. In the previous example, the thermocouple sensors which were replaced typically may not have measurement accuracy appreciably greater than 1 degree centigrade. The mote sensors may be thermistors, which use resistors to develop temperature readings, and may be an order of magnitude or more accurate than thermocouples.

Readings may be collected from two or more mote sensors of a mote network in different locations. One or more readings may be derived from these collected readings, where the derived readings emulate readings from at least one non-mote sensor in at least one non-mote sensor location.

Besides replacing previously used sensors with a network of mote sensors, mote sensors emulating some other type of sensor can obviously be used in new installations which would ordinarily use the other sensor.

Network Adaptation

Various aspects of the data collection and/or emulation may be adapted to improve accuracy and/or account for environmental factors such as mote failures (henceforth, "network adaptation"). For example, the number of mote sensors, the number of mote sensor locations, and/or the mote sensor locations may be adapted to account for one or more mote sensors that were providing readings but which have failed. Network adaptation may be caused by external logic (e.g. logic 113) or by the mote network itself (a.k.a. the mote network is "self-adapting").

Network adaptation may include and/or involve changing at least one of the mote sensor locations to improve the accuracy of the emulation of the sensors (henceforth, "location adaptation"). Location adaptation may be caused by external logic (e.g. logic 113) or by the mote network itself (a.k.a. the mote network is "self-adapting").

Network adaptation may be performed to account for changes to one or more of the mote sensor locations, accuracy of the emulating of the number of sensors, performance of the emulating of the number of sensors, or to changes in the environment of the mote network. As an example where a changed mote position may result in network adaptation, a mote which is providing readings used in sensor emulation may be dislodged from its position, say the underside of a table, and fall to the floor. Its readings may then be lower, as the cold generated by air conditioning in the location is most intense on the floor. The system may recognize directly that the location of the mote has changed, using location logic, or it may recognize that the readings being given by the mote are uncharacteristic of its prior position. The system may then adapt by selecting one or more motes to replace the mote in providing readings used in the emulation.

As an example of when reading accuracy may trigger adaptation, the system may examine the accuracy of readings, either automatically or triggered by the intervention of some person or device(s). For example, a person may bring a highly accurate thermometer into the room and take readings at the two emulated locations. If the accuracy of the mote readings is not comparable, the system may adapt which and/or how many motes to use to provide readings.

As another example of adaptation, motes may be added to the system, or one or more motes in the system may have their locations moved. The system may then adapt the selection of motes to use for emulation, resulting in increased emulation accuracy going forward.

As another example of adaptation, a part of the mote environment becomes contaminated. For example, workers might respond to a small fire by spraying part of a wall or other surface with fire retardant, which may then coat the motes attached thereon. The system may recognize these motes are no longer giving characteristic readings and may then select one or more replacement motes.

Network adaptation may involve observing behavior and/or characteristics of the sensors to emulate, and refining a selection of the mote sensors, the number of mote sensors, the mote sensor locations, and/or the number of mote sensor locations in order to improve emulation of behavior and/or characteristics of the sensors. For example, motes 102-104 may provide pressure readings in a pipe 117 carrying a moving fluid. A conventional non-mote pressure sensor may also be present in the pipe. The system may observe behavior and/or characteristics of the pressure sensor to emulate, and refine a selection of the mote sensors, the number of mote sensors, the mote sensor locations, and/or the number of mote sensor locations in order to improve emulation of behavior and/or characteristics of the non-mote pressure sensor.

Network adaptation may involve selecting one or more replacement mote sensors (a.k.a. "mote replacement") to replace one or more failed mote sensors as a source of the collected readings. Mote replacement may in some cases involve the mote network selecting one or more replacement mote sensors to replace one or more failed mote sensors as a source of the collected readings. In other cases, external logic such as logic 113 may select mote replacements.

Emulation Interface

An interface device such as device 111 may be provided to receive and/or collect readings from the mote sensors, and to convert the readings into at least one non-mote sensor reading. The device 111 may include logic to communicate the at least one non-mote sensor reading via a non-mote sensor interface. Thus, the device 111 may serve to emulate at least one non-mote (e.g. legacy) sensor via a mote network (henceforth, "sensor interface emulation"). Sensor interface emulation may include and/or involve logic to emulate a manner of communication of the at least one non-mote sensor. In other words, the device 111 may appear as the non-mote sensor(s) to controllers or other devices adapted to interact with the non-mote sensor(s).

Some applications may not employ an external device 111. Instead, the mote network itself may provide the functions of the external device 111.

In some applications the location(s) of the emulated non-mote sensor(s) may be relevant to controllers or other devices that interact with the non-mote sensors. The device 111 may include and/or involve logic to apply location information for the mote sensors that provide the readings in order to derive at least one emulated non-mote sensor location. For example, in the example of motes emulating thermocouples, the device 111 may determine two locations with which to associate the emulated thermocouple readings, based upon the locations of the motes chosen to provide readings for the emulation. In some situations the mote network itself may provide these features.

The device 111 may include and/or involve logic to select at least one mote sensor to provide the readings (henceforth, "mote sensor selection"). Mote sensor selection may involve logic to select one or more mote sensors to compensate for at least one failed mote sensor, and or logic to select at least one mote sensor to increase an accuracy of emulation of the at least one non-mote sensor. In some implementations, the mote network itself may provide these features.

The device 111 may include and/or involve logic to cause a change in at least one location from which the readings are provided. The logic to cause a change in at least one location from which the readings are provided (henceforth, 'mote location selection') may include and/or involve logic to deselect at least one mote as a source of the readings and to select at least one other mote as the source of the readings. This may include and/or involve logic to cause at least one mote that is a source of the readings to change position.

Process of Mote Network Sensor Emulation

Figure 2:
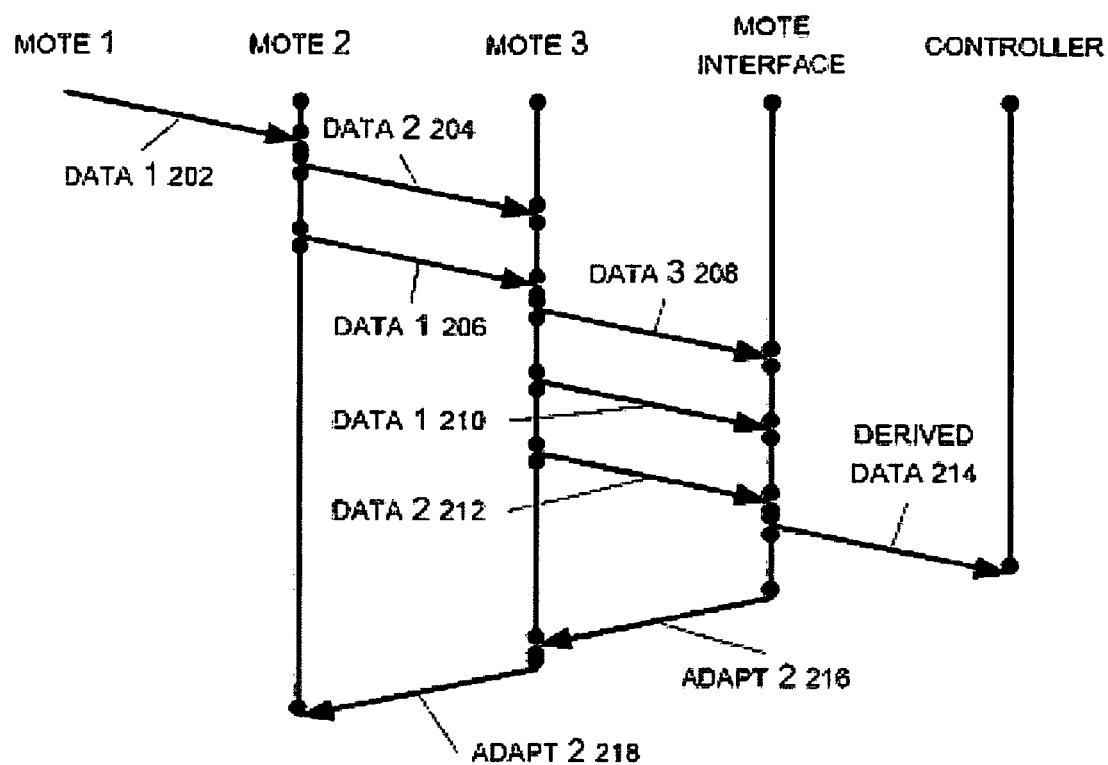
FIG. 2 is an action flow diagram of an embodiment of a process of mote network sensor emulation.

FIG. 2 is an action flow diagram of an embodiment of a process of mote network sensor emulation. The motes in the network communicate with their nearest neighbors. The mote closest to the interface device passes all such communication it receives to the mote interface.

At 202 mote 1 communicates its sensor reading to mote 2. At 204 mote 2 communicates its sensor reading to mote 3. At 206 mote 2 communicates mote 1's sensor data to mote 3. At 208, 210, and 212 mote 3 communicates the data for itself, mote 1, and mote 2 respectively to the mote interface.

The mote interface then calculates the derived data value for the sensor or sensors which are being emulated. At 214, this derived data is communicated to the controller.

The mote interface has recognized that the emulation(s) may better be performed by making some change affecting mote 2, and at 216, the mote interface sends the information to perform the mote 2 adaptation to mote 3. At 218, mote 3 communicates this information about the mote 2 adaptation to mote 2.

Mote Network Sensor Emulation

Figure 3:
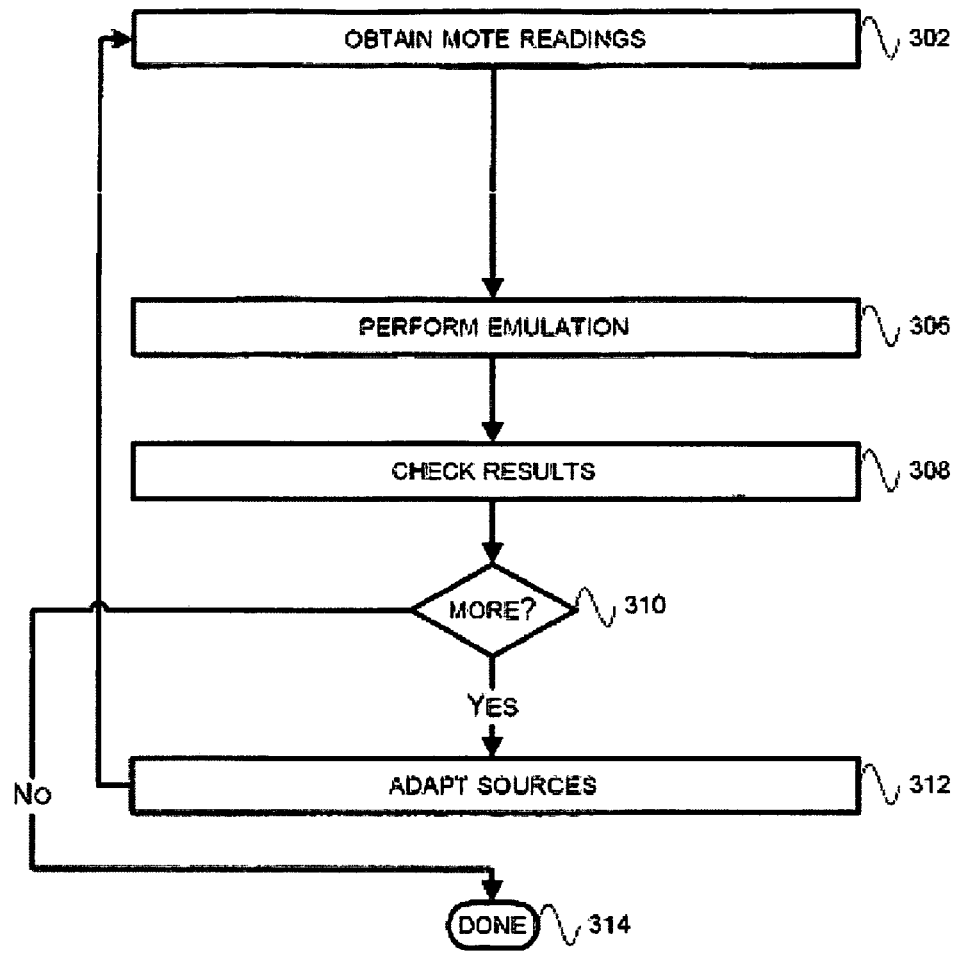
FIG. 3 is a flow chart of an embodiment of mote network sensor emulation.

FIG. 3 is a flow chart of an embodiment of mote network sensor emulation. At 302, readings from the motes participating in the sensor emulation are obtained. At 306, the emulation is performed. At 308, the results of the emulation are examined. At 310, if the results are satisfactory, at 314 the emulation is complete.

If unsatisfactory, at 312 the calculations and/or motes used may be adjusted. Additional mote readings may be obtained at 302, and the process repeats.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:
    collecting one or more readings from a number of mote sensors of a mote network, the number of mote sensors at a number of mote sensor locations;
    emulating, as a source or sources of the one or more readings, a number of sensors, including using the collected one or more readings to determine one or more derived values having an accuracy that is greater than at least some of the collected one or more readings from the number of mote sensors; and
    refining a selection of at least one of the mote sensors of the mote network based at least partially on the emulating, wherein the refining a selection of at least one of the mote sensors of the mote network includes at least using one or more portions of the mote network to:
    a) observe at least one of a behavior or a characteristic of at least one of the number of sensors in order to improve emulation of at least one of a behavior or a characteristic of a number of the mote sensors, and
    b) at least refine a selection of at least one of the mote sensors, a number of mote sensors, one or more mote sensor locations, or a number of mote sensor locations in order to improve emulation of at least one of a behavior or a characteristic of a number of the mote sensors.

2. The method of claim 1, wherein emulating, as a source or sources of the one or more readings, a number of sensors further comprises:
    emulating, as a source or sources of the one or more readings, a number of sensors at a number of sensor locations different than the number of mote sensors.

3. The method of claim 1, wherein collecting the one or more readings from a number of mote sensors of a mote network further comprises:
    collecting the one or more readings from a number of mote sensors less than the number of the one or more sensors.

4. The method of claim 1, wherein collecting one or more readings from a number of mote sensors of a mote network further comprises:
    collecting the one or more readings from at least one mote sensor location different than any of the sensor locations.

5. The method of claim 1, wherein emulating, as a source or sources of the one or more readings, a number of sensors further comprises:
    emulating one sensor.

6. The method of claim 1, further comprising:
    observing at least one of a behavior or a characteristic of at least some of the number of mote sensors.

7. The method of claim 1, wherein collecting the one or more readings from a number of mote sensors of a mote network further comprises:
    collecting the one or more readings from a number of mote sensors greater than the number of sensors.

8. The method of claim 1, further comprising:
    adapting one or more of the number of mote sensors, the number of mote sensor locations, or the locations of the mote sensors to account for one or more failed mote sensors.

9. The method of claim 8, wherein adapting one or more of the number of mote sensors, the number of mote sensor locations, or the one or more mote sensor locations to account for one or more failed mote sensors further comprises:
the mote network adapting one or more of the number of mote sensors, the number of mote sensor locations, or the mote sensor locations to account for one or more failed mote sensors.

10. The method of claim 1, further comprising:
changing at least one of the mote sensor locations to improve the accuracy of the emulating of the sensors.

11. The method of claim 10, wherein changing at least one of the mote sensor locations to improve the accuracy of the emulating of the number of sensors further comprises:
the mote network selecting at least one of the mote sensor locations to improve the accuracy of the emulating of the sensors.

12. The method of claim 1, further comprising:
adapting the emulating to account for one or more changes to (a) one or more of the mote sensor locations, (b) accuracy of the emulating of the number of sensors, (c) performance of the emulating of the number of sensors, or (d) the environment of the mote network.

13. The method of claim 1, wherein the number of sensors includes at least one of a temperature sensor or a pressure sensor.

14. A method comprising:
collecting one or more readings from two or more mote sensors of a mote network, the two or more mote sensors in two or more mote sensor locations;
deriving one or more derived readings from the collected one or more readings, the one or more derived readings emulating one or more readings from at least one non-mote sensor in at least one non-mote sensor location, including using the collected one or more readings to derive one or more derived readings having an accuracy that is greater than at least some of the collected one or more readings from the non-mote sensor;
refining a selection of at least one of the mote sensors of the mote network based at least partially on the deriving, wherein refining a selection of at least one of the mote sensors of the mote network includes at least using one or more portions of the mote network to observe at least one of a behavior or a characteristic of at least one of the number of sensors in order to improve emulation of at least one of a behavior or a characteristic of at least one of the two or more mote sensors, and at least refining a selection of at least one of the mote sensors, a number of the mote sensors, at least one of the two or more mote sensor locations, or a number of mote sensor locations in order to improve emulation of at least one of a behavior or a characteristic of at least one of the two or more mote sensors.

15. The method of claim 14, further comprising:
selecting one or more replacement mote sensors to replace one or more failed mote sensors as a source of the one or more collected readings.

16. The method of claim 15, wherein selecting one or more replacement mote sensors to replace one or more failed mote sensors as a source of the one or more collected readings further comprises:
mote network selecting one or more replacement mote sensors to replace one or more failed mote sensors as a source of the one or more collected readings.

17. The method of claim 14, further comprising:
the mote network selecting at least one of the mote sensor locations to improve an accuracy of the one or more derived readings.

18. The method of claim 14, further comprising:
adapting the emulating to account for one or more changes to the one or more mote sensor locations.

19. The method of claim 14, wherein refining a selection of at least one of the mote sensors of the mote network based at least partially on the deriving comprises:
refining at least one of a selection of the two or more mote sensors from which to collect the one or more readings to improve emulation of the at least one non-mote sensor.

20. The method of claim 14, wherein the non-mote sensor includes at least one of a legacy sensor, a temperature sensor or a pressure sensor.

21. An apparatus at least partially implemented using hardware, comprising:
logic to receive one or more readings from two or more mote sensors;
logic to convert the one or more readings into at least one non-mote sensor reading including increasing an accuracy of the at least one non-mote sensor reading during the conversion;
logic to communicate the at least one non-mote sensor reading via an interface; and
logic to refine a selection of at least one of the mote sensors of the mote network based at least partially on the logic to convert the one or more readings, wherein the logic to refine a selection of at least one of the mote sensors of the mote network includes at least:
logic to use one or more portions of the mote network to observe at least one of a behavior or a characteristic of at least one of the number of sensors in order to improve conversion of at least one of a behavior or a characteristic of the mote sensor, and to refine a selection of at least one of a number of mote sensors, one or more mote sensor locations, or a number of mote sensor locations in order to improve conversion of at least one of a behavior or a characteristic of the mote sensor.

22. The apparatus of claim 21, wherein the logic to communicate the at least one non-mote sensor reading via an interface further comprises:
logic to emulate a manner of communication of the at least one non-mote sensor.

23. The apparatus of claim 21, further comprising:
logic to apply location information for the two or more mote sensors to derive at least one emulated non-mote sensor location.

24. The apparatus of claim 21, further comprising:
logic to select at least one mote sensor to provide the one or more readings.

25. The apparatus of claim 24, wherein the logic to select at least one mote sensor to provide the one or more readings further comprises:
logic to select one or more mote sensors to compensate for at least one failed mote sensor.

26. The apparatus of claim 24, wherein the logic to select at least one mote sensor to provide the one or more readings further comprises:
logic to select at least one mote sensor to increase an accuracy of emulation of the at least one non-mote sensor.

27. The apparatus of claim 21, further comprising:
logic to emulate at least one source of non-mote sensor readings.

28. The apparatus of claim 21, further comprising:
   logic to cause a change in at least one location from which the one or more readings are provided.

29. The apparatus of claim 28, wherein the logic to cause a change in at least one location from which the one or more readings are provided further comprises:
   logic to deselect at least one mote as a source of the one or more readings and to select at least one other mote as the source of the one or more readings.

30. The apparatus of claim 28, wherein the logic to cause a change in at least one location from which the one or more readings are provided further comprises:
   logic to cause at least one mote that is a source of the one or more readings to change position.

* * * * *